United States Patent
Dvorkin et al.

(10) Patent No.: US 9,852,050 B2
(45) Date of Patent: Dec. 26, 2017

(54) SELECTING COMPUTING RESOURCES

(71) Applicant: VMware, Inc., Palo Alto, CA (US)

(72) Inventors: Alex Dvorkin, Petah Tikva (IL); Vova Strazhnikov, Netanya (IL)

(73) Assignee: VMWARE, INC., Palo Alto, CA (US)

( * ) Notice: Subject to any disclaimer, the term of this patent is extended or adjusted under 35 U.S.C. 154(b) by 343 days.

(21) Appl. No.: 14/586,780

(22) Filed: Dec. 30, 2014

(65) Prior Publication Data
US 2016/0191407 A1 Jun. 30, 2016

(51) Int. Cl.
*G06F 15/167* (2006.01)
*G06F 11/36* (2006.01)
*G06F 9/50* (2006.01)
*G06F 9/00* (2006.01)

(52) U.S. Cl.
CPC ............ *G06F 11/3688* (2013.01); *G06F 9/00* (2013.01); *G06F 9/5072* (2013.01); *G06F 9/5077* (2013.01)

(58) Field of Classification Search
CPC .... G06F 9/5072; G06F 9/5066; G06F 9/5077; G06F 9/5061; G06F 11/3688
See application file for complete search history.

(56) References Cited

U.S. PATENT DOCUMENTS

| | | | | |
|---|---|---|---|---|
| 2008/0244600 A1* | 10/2008 | Wong | .................... | G06F 9/5083 718/104 |
| 2010/0306377 A1* | 12/2010 | DeHaan | ................ | G06F 9/5077 709/226 |
| 2015/0154713 A1* | 6/2015 | Diaz | ...................... | G06Q 40/08 705/4 |
| 2016/0156715 A1* | 6/2016 | Larouche | .............. | G06F 9/4881 709/201 |

* cited by examiner

*Primary Examiner* — Arvin Eskandarnia
*Assistant Examiner* — Austin Moreau
(74) *Attorney, Agent, or Firm* — Thomas | Horstemeyer, LLP

(57) ABSTRACT

Systems and methods are described for distributing pool resources. One method includes maintaining a plurality of groups of computing resources, wherein each group of the plurality of groups includes computing resources that share a respective combination of resource characteristics; receiving a first request to perform a first test on a computing resource; determining, from the plurality of groups of computing resources, a subset of groups of computing resources that include a respective combination of resource characteristics that satisfy the required characteristics of the first test; shuffling the subset of groups and selecting a first group from the shuffled subset of groups; selecting an available computing resource from the first group; and causing the first test to be performed on the selected available computing resource from the first group.

19 Claims, 4 Drawing Sheets

SELECTING COMPUTING RESOURCES

BACKGROUND

This document relates to selecting computing resources from a pool of computing resources to perform a test.

Software and hardware can be efficiently tested by maintaining a pool of computing resources, and providing multiple tests to computing resources in the pool. To properly execute the tests, computing resources may be required to have certain hardware or software characteristics. For example, a user can define specific constraints on characteristics of computing resources, e.g., that the tests need to execute on computing resources that execute a particular version of an operating system.

SUMMARY

In general, one aspect of the subject matter described in this document can be embodied in a technique that includes the actions of maintaining a plurality of groups of computing resources, wherein each group of the plurality of groups includes computing resources that share a respective combination of resource characteristics; receiving a first request to perform a first test on a computing resource, wherein the first request is non-concrete with respect to one or more required characteristics for the computing resource selected to perform the first test; determining, from the plurality of groups of computing resources, a subset of groups of computing resources that include a respective combination of resource characteristics that satisfy the required characteristics of the first test; shuffling the subset of groups and selecting a first group from the shuffled subset of groups; selecting an available computing resource from the first group; and causing the first test to be performed on the selected available computing resource from the first group.

These and other aspects can optionally include one or more of the following features. The actions can further include: receiving a second request to perform a second test on a computing resource; selecting a second group from the subset of groups; determining that there are no available computing resources in the selected second group; and selecting a third group from the subset of groups.

Determining that there are no available computing resources in the selected second group can include: identifying stored information that identifies groups of computing resources that include no available computing resources; and identifying the selected second group in the stored information. Selecting a third group can include randomly selecting the third group from the subset of groups. Shuffling the subset of groups can include shuffling the subset of groups to determine a random order for the groups in the subset of groups, wherein selecting the first group can include selecting the first group in the random order, wherein selecting the second group can include selecting the second group in the random order, and wherein selecting the third group comprises selecting the third group in the random order.

The actions can further include receiving a second request to perform the first test on a computing resource; obtaining information identifying the subset of groups of computing resources; randomly selecting a second group from the subset of groups; selecting an available computing resource from the second group; and causing the first test to be performed on the selected computing resource.

The required characteristics can identify one or more of one or more hardware characteristics or one or more software characteristics. Computing resources can be instantiated virtual machines and the resource characteristics can be allocated to each virtual machine from a pool of resources.

Particular embodiments of the subject matter described in this document can be implemented so as to realize one or more of the following advantages. A system can reduce the possibility of starvation of computing resources with particular resource characteristics in a pool of computing resources. The system can receive user provided tests that each need to be performed on computing resources with particular resource characteristics, and more effectively select a computing resource to perform each test.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
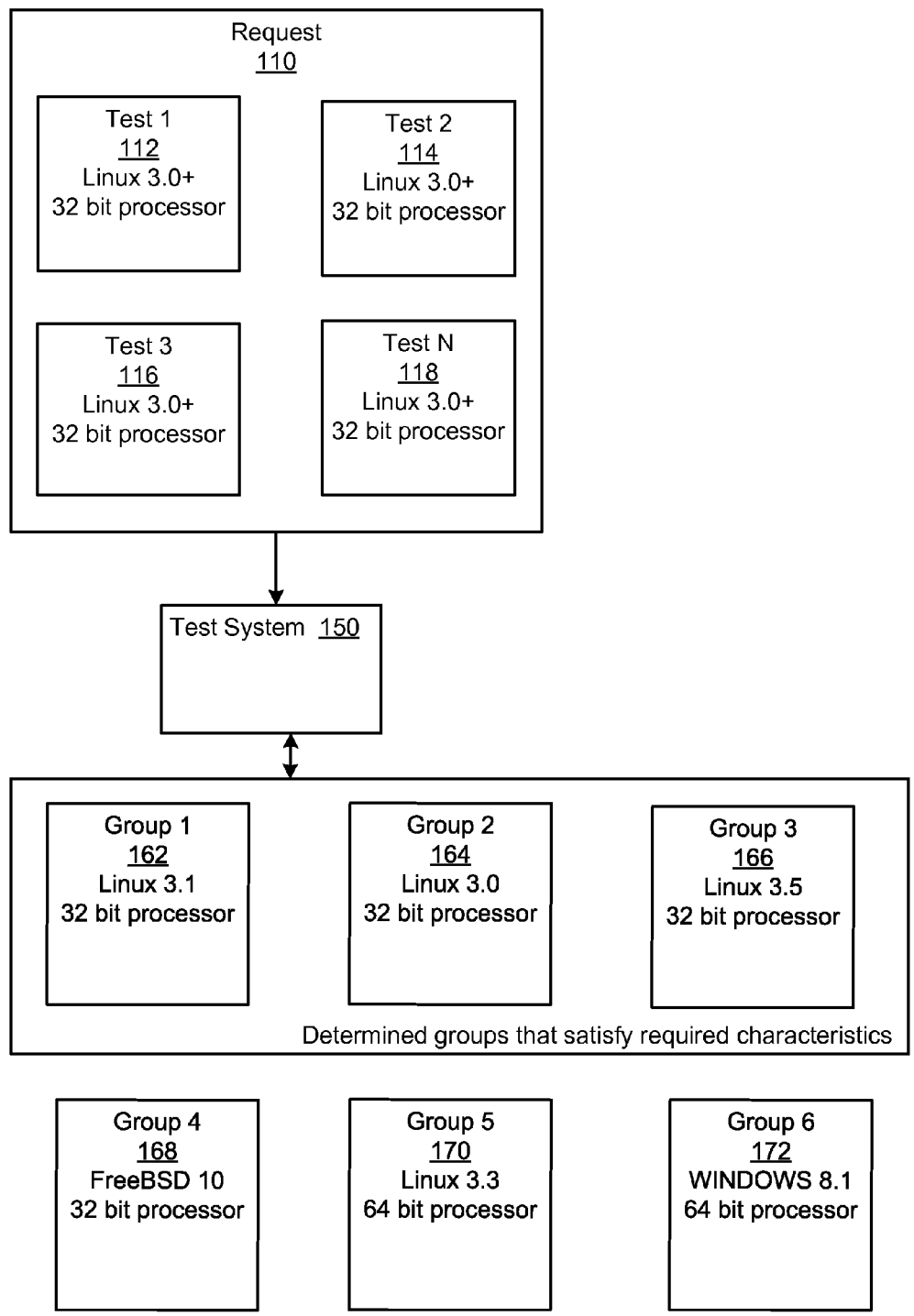
FIG. 1 illustrates an example of selecting computing resources to perform tests.

This document generally describes a process of selecting computing resources in a pool of computing resources that satisfy particular hardware and software constraints to perform tests. A computing resource can be a system of one or more computers connected together, or a virtual machine executing on a system of one or more computers. A pool of computing resources is a collection of computing resources. In implementations where the computing resources are a system of one or more computers, each computing resource can execute software, e.g., operating system(s), system software, and include hardware, e.g., processor, memory, network resources. In implementations where the computing resources are virtual machines, the computing resources can be instantiated by a system and have software and hardware resources allocated to each computing resource from a pool of resources maintained by the system. The computing resources can be organized into groups of computing resources, with each group including computing resources that share one or more of the same resource characteristics.

The system can receive one or more requests that each include multiple tests to perform, and select a computing resource in the pool of computing resources to perform each test. A test may include, for example, steps, modules, or routines to be executed by a computing resource.

A user (or the request) can specify required characteristics that identify required hardware and software resource characteristics of computing resources that can perform tests in a request. A required characteristic is a software or hardware resource characteristic that is a necessary condition that must be satisfied by computing resources selected to perform the tests. For instance, the user can specify that the tests need to be performed by computing resources with a particular amount of memory, with greater than a particular amount of memory, that execute a particular operating system or operating system version, and so on. Alternatively, the test itself may be associated with the required characteristics that must be satisfied by the computing resources.

Some requests may contain specifications that are concrete, while others may be non-concrete. If the specification is concrete, it identifies specific type and version of hardware and/or software characteristics that are required for the test to be performed. If the request is non-concrete, the characteristics can be satisfied by more than one type of resource characteristic, e.g., hardware or software resource characteristic. For instance, a non-concrete request may specify that the tests need to be performed by computing resources that execute a particular operating system (e.g., Microsoft Windows), but not specify a particular operating system version (e.g., XP, Vista, Windows 7, Windows 8, etc.). In this instance, any computing resource that executes the particular operating system can be used to execute the test, regardless of which version of the operating system the computing resource executes.

The system determines one or more groups of computing resources that include computing resources that satisfy the required characteristics. For example, if the request contains a concrete specification that specifies a particular version of an operating system, only the group of computing resources having that particular operating system can be selected to perform the test. On the other hand, if the request is non-concrete with respect to the version of the operating system, computing resources from multiple groups may potentially be selected to perform the test. If the request is non-concrete, the system first determines all concrete specifications that can be used to satisfy the request, i.e., determines all the groups of computing resources that can be used to perform the test. After determining the groups of computing resources that satisfy required characteristics, the system shuffles the specifications and then tries to satisfy them one by one. For example, it is possible to randomly shuffle a finite set with complexity of O(n), such as by using the Fisher-Yates shuffle or another shuffling algorithm.

Following the example above, if the request is non-concrete with respect to the operating system and there are computing resources with 3 different versions of a requested operating system (e.g., 5 devices with Windows XP, 10 devices with Windows Vista and 15 devices with Windows 7), the system would identify 3 groups of resources, shuffle them and then try to satisfy the request using a resource from one of those groups. This would result in probabilities of 33%-33%-33% for each version of the OS for the starting requests, regardless of the number of the devices in each group. While this algorithm is more likely to deplete machines of the scarcest type of OS version sooner than randomly selecting any resource with the requested OS regardless of type, it attempts to maintain fairness between resource distribution for the tests given the current state of the device pool.

FIG. 1 illustrates an example of selecting computing resources to perform tests. In the example of FIG. 1 a test system 150, e.g., a system of one or more computers in one or more locations, or one or more virtual machines executing on one or more computers in one or more locations, receives a request 110, e.g., from a user device. The request 110 identifies multiple tests, e.g., tests 1-N 112-118, and identifies, for each test, required hardware and software characteristics for computing resources on which the test is to be performed, e.g., that the computing resource should have at least version 3.0 of the operating system Linux and have a 32 bit processor.

The test system 150 maintains multiple groups of computing resources 162-172. The computing resources in each group share one or more resource characteristics, e.g., hardware characteristics, software characteristics, or both. For instance, group 1 162 includes computing resources that have 32 bit processors and execute version 3.1 of the operating system Linux. Group 2 164 includes computing resources that have 32 bit processors and execute version 3.0 of the Linux operating system.

The test system 150 receives the request 110, and obtains the required characteristics for each test identified in the request 110, e.g., from metadata included in the request 110. In some implementations, the required characteristics can be the same for every test identified in the request 110. In some other implementations, the required characteristics can vary among the tests identified in the request 110.

After obtaining the required characteristics, the test system 150 determines, for each test, groups of computing resources that include computing resources that satisfy each of the required characteristics for the test. For instance, the test system 150 determines that groups 1-4 162-168 include computing resources that satisfy one of the required characteristics, e.g., that the computing resources in the groups have a 32 bit processor. The test system 150 determines that groups 1, 2, 3, 5, 162-166, 170, include computing resources that satisfy a different required characteristic, e.g., that the computing resources in the groups execute at least version 3.0 of the Linux operating system. The test system 150 therefore determines that groups 1-3 162-166 include computing resources that satisfy all of the required characteristics for the tests identified in the request 110.

The test system 150 then randomly selects a group of computing resources from the determined groups 162-166, and provides a test, e.g., test 112, to a computing resource in the randomly selected group. The test system 150 selects a computing resource to perform the test 112 by identifying an available computing resource in the group, e.g., a computing resource that is not already performing a test.

The test system 150 randomly selects a group of computing resources for each test included in the request 110, and provides the test to an available computing resource in the randomly selected group. If there is no available computing resource in the selected group, the test system 150 randomly selects from among the remaining groups of computing resources and provides the test to an available computing resource in the randomly selected group.

Figure 2:
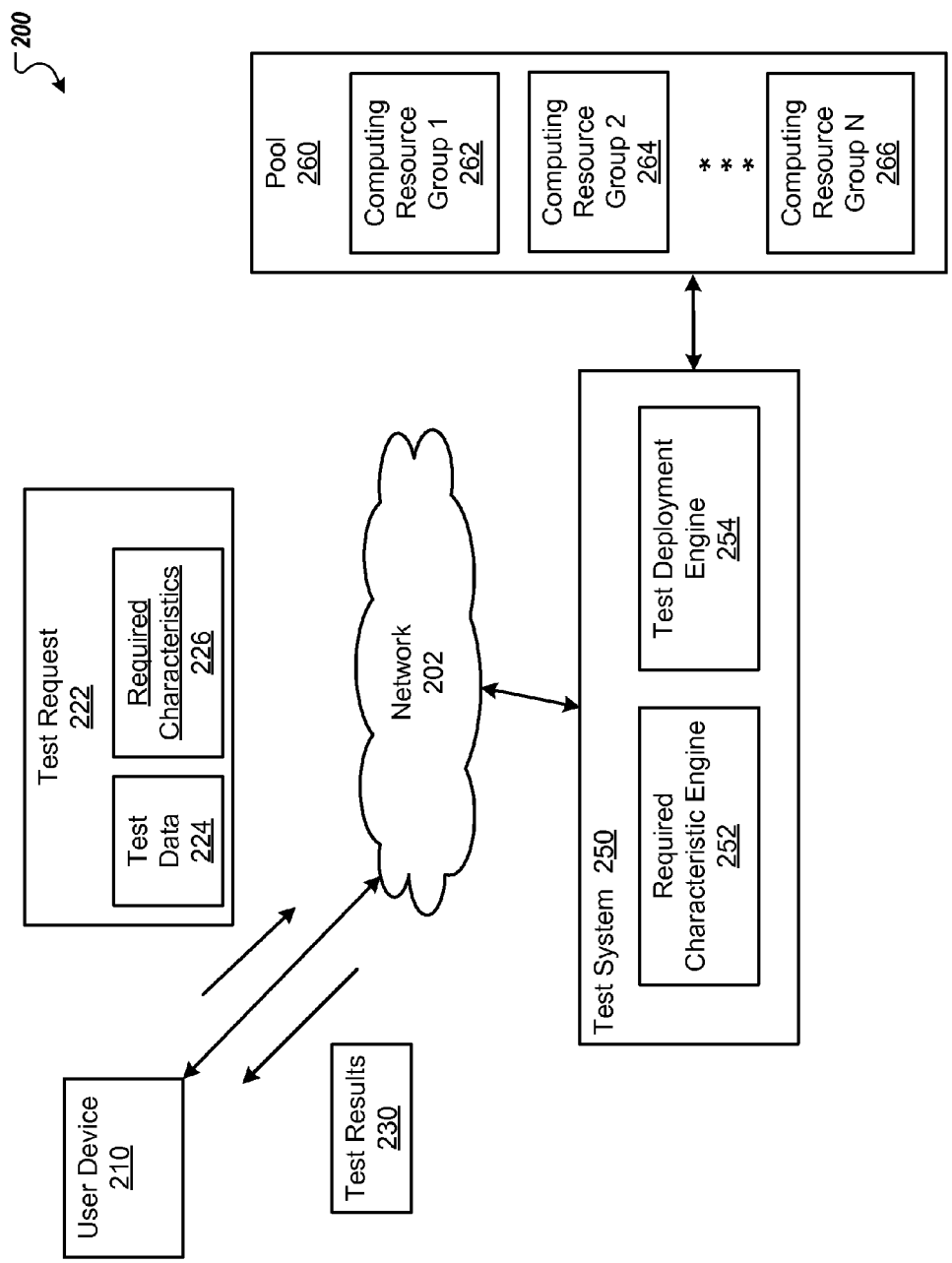
FIG. 2 shows an example environment in which a test system performs tests.

FIG. 2 shows an example environment 200 in which a test system 250, e.g., the test system 150 of FIG. 1, performs tests. The example environment 200 includes a network 202, e.g., a local area network (LAN), wide area network (WAN), e.g., the Internet, or a combination thereof. The network 202 connects user devices, e.g., a user device 210, with the test system 250.

The test system 250 maintains a pool of computing resources that includes computing resources with respective hardware and software resource characteristics. Each computing resource is included in a group of computing resources that share one or more of the same resource characteristics, e.g., groups 262-266.

The user device 210 is an electronic device, e.g., a computer, that can send a request to perform one or more tests to the test system 250, e.g., a test request 222. The request 222 includes test data 224 for a test to be performed by the test system 250.

The test data 224 may specify steps, routines, modules, data, and so on, to be performed as part of the test by a computing resource included in the pool 260. For example, if the test includes the creation of a test user, the test data 224 may include a user name, the user's role and other data related to the test user. As another example, for if the test relates to provisioning a virtual machine, the test data 224 may include the name of the virtual machine, a template identifier from which the virtual machine may be cloned, and/or other data related to the virtual machine and the management of the virtual machine.

The test request 222 also includes required characteristics 226, e.g., software characteristics or hardware characteristics, for computing resources selected to perform the test. Each of the required characteristics 226 can identify one or more resource characteristics of a computing resource, e.g., minimum speed of a processor, a type of processor, a minimum number of cores of a processor, number of processors, type of memory, amount of memory, operating system, version(s) of an operating system, software, version (s) of software, and so on. For example, a data processing intensive test may require a minimum, or a particular, number of central processing units (CPUs) necessary to perform the processing for the test, and a minimum, or a particular, amount of available memory in order for data to be processed correctly during the test.

In some implementations, the required characteristics 226 are specified in metadata attached to, or included with, the test request 222 or test data 224. For example, the user may generate a document or other type of file that specifies required characteristics 226 for the test. In this way, the required characteristics for each test to be performed by the test system 250 can be received by the test system 250 along with the data identifying the test that is to be performed.

The test system 250 includes a required characteristic engine 252 and a test deployment engine 254. The required characteristic engine 252 can obtain required characteristics 226 for a received test, and determine groups of computing resources that can satisfy the required characteristics 226. While each determined group includes computing resources that satisfy each of the required characteristics 226 for the test, the resource characteristics in the group may vary from group to group. For instance, if the required characteristics 226 require a 32 bit processor and a particular operating system greater than version 7, a first group that satisfies the required characteristics, e.g., group 262, can include computing resources that have been allocated 32 bit processors and the particular operating system version 8, and a second group that satisfies the required characteristics, e.g., group 264, can include computing resources that have been allocated 32 bit processors and the particular operating system version 9.

The test deployment engine 254 obtains information identifying the groups of computing resources that satisfy the required characteristics 226 for the test identified in the test data 224, e.g., from the required characteristic engine 252, and select a computing resource to perform the test. In general, in order to select a computing resource to perform a given test, the test deployment engine 254 randomly selects a group from among the groups that have characteristics that satisfy the required characteristics 226 for the test, and determines whether there are any available computing resources, e.g., any computing resources not currently performing a test, in the selected group. If there are any available computing resource in the selected group, the test deployment engine 254 provides the test to one of the available computing resources, as described below with reference to FIG. 3. If there are no available computing resources in the selected group, the test deployment engine 254 randomly selects from amongst the remaining groups that have characteristics that satisfy the required characteristics 226 for the test, as described below with reference to FIG. 4.

Similarly, the required characteristic engine 252 can determine groups of computing resources for each other test identified in the test request 222, and the test deployment engine 254 can provide each of the other tests to a randomly selected group of computing resources.

After all of the tests identified in the test request 222 have been performed by computing resources, the test system 250 provides test results 230 back to the user device 210, e.g., in response to the request 222. Alternatively, as each test is completed, the test system 250 can provide test results for the test to the user device 210 without waiting for all of the tests to be completed.

Figure 3:
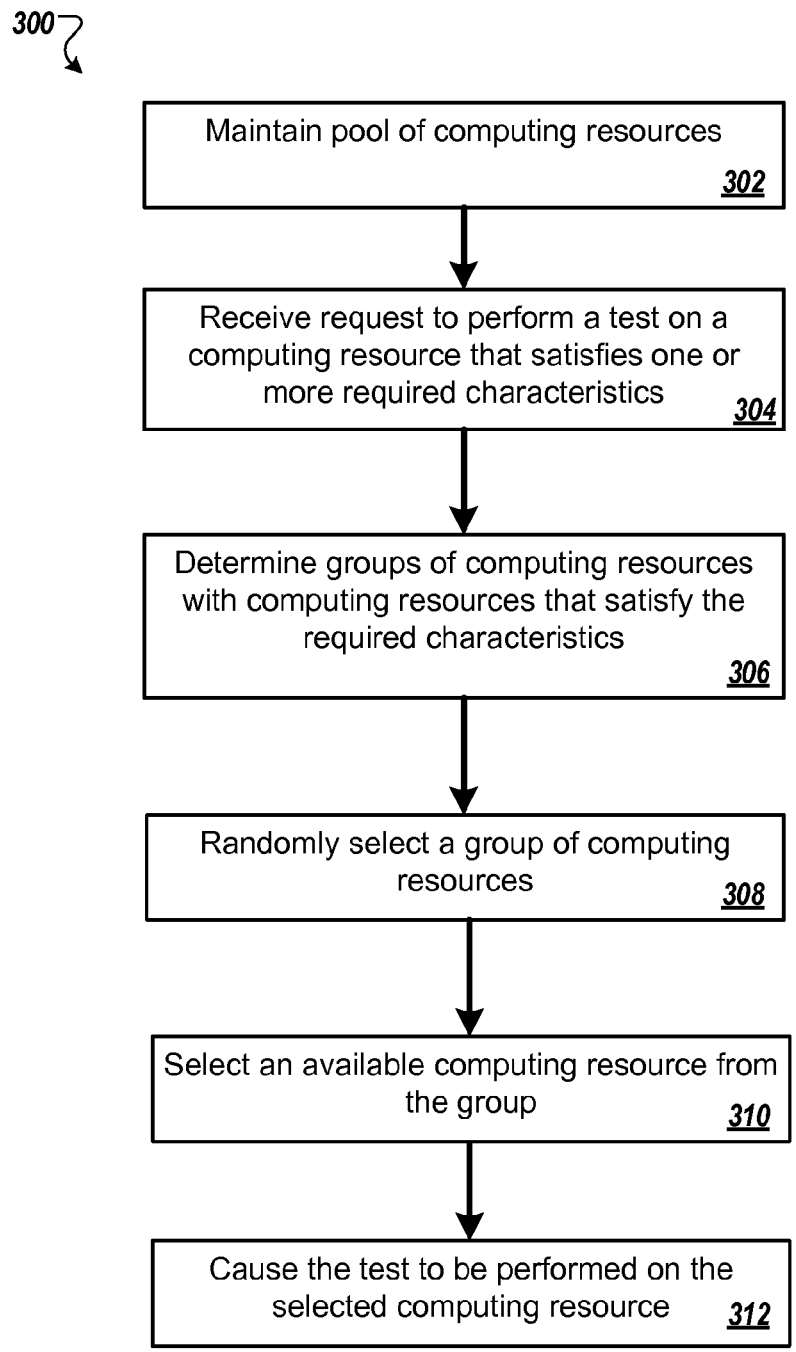
FIG. 3 is a flow chart of an example process for selecting a computing resource to perform a test.

FIG. 3 is a flow chart of an example process 300 for selecting a computing resource to perform a test. The example process 300 is performed by a system of one or more computers. For example, the process 300 may be performed by the test system 250 of FIG. 2.

The system maintains a pool of computing resources (step 302). The pool of computing resources includes computing resources with specific hardware resource characteristics, e.g., processors, memory, network resources, and software resource characteristics, e.g., operating system types, operating system versions, software applications, and so on.

The system can store information identifying each of the computing resources and resource characteristics, e.g., hardware and software resource characteristics, possessed by each of the computing resource in the pool. In some implementations, the system can maintain a mapping between each computing resource and identifiers of resource characteristics of the computing resource.

The system maintains the computing resources in groups. Each group of computing resources includes computing resources that share one or more of the same resource characteristics, e.g., the same version of an operating system, same processor type, and so on.

The system receives a request to perform a test on a computing resource (step 304). The request identifies one or more required characteristics for the computing resource on which the test is to be performed, e.g., required software characteristics, required hardware characteristics, or both, that identify constraints on resource characteristics of the computing resource on which the test is to be performed. For instance, one of the required characteristics may specify that the test should be performed on a computing resource with a 32 bit processor.

The system determines groups of computing resources that satisfy the required characteristics (step 306). That is, the system determines groups of computing resources that have characteristics that satisfy all of the required characteristics for the test.

The system identifies resource characteristics that satisfy the required characteristics. As described above, some required characteristics can be satisfied by more than one resource characteristic. For instance, a required characteristic can be a particular operating system greater than version 7. Thus, resource characteristics that can satisfy the required characteristic can be the particular operating system version 8 and the particular operating system version 9.

The system identifies groups of computing resources that include computing resources that satisfy the required characteristics. In some implementations the system stores information identifying each determined group.

The system randomly selects a group of computing resources from the groups that include computing resources that satisfy the required characteristics (step 308). The system can utilize any random selection process to select the group of computing resources, e.g., a process with sufficient entropy, or any pseudorandom process, e.g., a process exhibiting statistical randomness but generated by a deterministic process. In some implementations, the system randomly shuffles the groups to determine a random order for the groups and then selects one of the shuffled groups, e.g., the first shuffled group in the random order.

The system selects an available computing resource from the selected group (step 310). That is, the system determines whether there are any available computing resource in the selected group and, if there are, selects one of the available computing resources. The system can randomly select an available computing resource from the available computing resources in the selected group, e.g., the system can obtain information identifying all available computing resources and randomly select a computing resource. Alternatively, the system can select a first available computing resource in the selected group, e.g., the system can obtain information identifying all available computing resources in the selected group and select the first identified computing resource in the information.

An available computing resource is a computing resource that is not currently performing a test and is not otherwise unavailable to perform the test, e.g., has not crashed or gone offline.

Upon selecting an available computing resource, the system stores information identifying the computing resource as unavailable. If the selected computing resource is the last available computing resource in the selected group, the system can store information identifying that the group includes no available computing resources. Furthermore, if there are no available computing resources in the group, the system randomly selects a remaining group of computing resources, as described below with reference to FIG. 4. When a computing resource in the group finishes performing a test, the system can identify the resource as available and modify the stored information to indicate that the group again includes one or more available resources.

The system causes the test to be performed on the selected computing resource (step 312). For example, the system can provide data identifying the test to the computing resource with instructions, e.g., executable code, that cause the selected computing resource to perform the test.

After the selected computing resource has finished performing the test, the system receives test results from the computing resource, provides the test results to the user device, and identifies the computing resource as available to perform another test The system performs steps 304-312 for each test received a given test request. In some implementations, if two or more of the tests in the test request have the same required characteristics, the system can only determine the groups of computing resources that satisfy the required characteristics for the initial test in the test request and re-use that information for subsequent tests in the request that have the same required characteristics.

Figure 4:
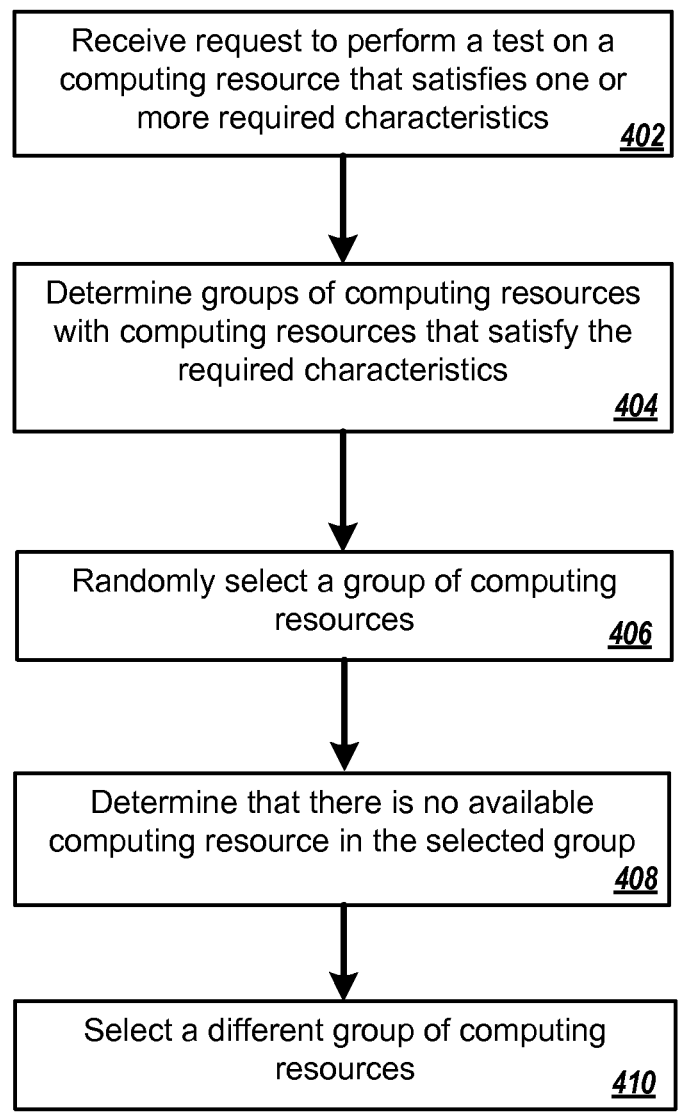
FIG. 4 is a flow chart of another example process for selecting a computing resource to perform a test.

FIG. 4 is a flow chart of another example process 400 for selecting a computing resource to perform a test. The example process 400 is performed by a system of one or more computers. For example, the process 400 may be performed by the test system 250 of FIG. 2.

The system receives a request to perform a test on a computing resource that satisfies one or more required characteristics for the test (step 402). The request includes a test and required characteristics of computing resources that can perform the test.

The system determines groups of computing resources that include computing resources that satisfy the required characteristics (step 404). The system determines the groups as described above with reference to FIG. 3.

The system randomly selects a group of computing resources from the determined groups of computing resources (step 406). The system performs a random selection of the determined groups, as described above with reference to FIG. 3.

The system determines that there are no available computing resources in the selected group (step 408). In some implementations, the system maintains information identifying groups of computing resources that do not include available computing resources. The system can check whether the selected group is included in this information, and if so can determine that there are no available computing resources.

The system selects a different group of computing resources from the determined groups of computing resources (step 410). In some implementations, upon determining that there is no available computing resource in the group, the system randomly selects from among the remaining groups of computing resources that include computing resources that satisfy the required characteristics.

In some other implementations, rather than randomly selecting a different group, the system can pre-compute a random order of groups of computing resources that satisfy the required characteristics. In these implementations, the system can select the first group identified by the random order, e.g., with reference to step 406, and then upon determining there are no available computing resources in the selected first group, the system can select the second group identified by the random order. In some implementations the system can effect this pre-computation by performing a particular process on the groups of computing resources, e.g., a Fisher-Yates shuffle, Knuth shuffle, and so on.

After selecting a different group of computing resources, the system provides the test to an available computing resource included in the different group. If there is no available computing resource in the different group, the system repeats steps 406-410. In some implementations, rather than perform the process 400, after determining the groups that satisfy the required characteristics in step 306, the system can consult the data identifying groups that have no available computing resources and remove any such groups from the determined groups that satisfy the required characteristics, i.e., to ensure that a group with no available resources is not the group that is randomly selected to perform the test.

Although the specification describes selecting computing resources to perform a test, the described techniques can be generalized to selecting computing resources from a pool of computing resources for any purpose. For instance, computing resources can be selected to satisfy web requests with different constraints. Additionally, the described techniques can be applied to other situations to reduce the possibility of starvation of resources. For example, a car rental service can utilize the described techniques to create groups of cars, with each group including cars that share one or more characteristics, e.g., model, manufacturer, color, four wheel vs two wheel drive. The car rental service can select cars, using the described techniques, to provide to customers who identify specific constraints.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   maintaining a plurality of computing resources comprising instantiated virtual machines, wherein the plurality of computing resources are organized into a plurality of groups of computing resources, wherein each group of the plurality of groups includes computing resources that share a respective combination of resource characteristics, wherein the resource characteristics are allocated to each virtual machine from a pool of resources;
   receiving a first request to perform a first test on a computing resource, wherein the first request comprises a non-concrete requirement among a plurality of required characteristics for the computing resource selected to perform the first test, the non-concrete requirement representing a range of computing resource characteristics or a set of approved computing resources that can satisfy the first request;
   determining, from the plurality of groups of computing resources, a subset of groups of computing resources, the subset of groups comprising a plurality of groups that include a respective combination of resource characteristics that satisfy the required characteristics of the first test;
   shuffling the subset of groups and selecting a first group from the shuffled subset of groups;
   selecting an available computing resource from the first group; and
   causing the first test to be performed on the selected available computing resource from the first group, wherein causing the first test to be performed comprises transmitting test data associated with the first test to the selected available computing resource, the test data being used by the selected available computing resource to execute the first test.

2. The method of claim 1, further comprising:
   receiving a second request to perform a second test on a computing resource;
   selecting a second group from the subset of groups;
   determining that there are no available computing resources in the selected second group; and
   selecting a third group from the subset of groups.

3. The method of claim 2, wherein determining that there are no available computing resources in the selected second group comprises:
   identifying stored information that identifies groups of computing resources that include no available computing resources; and
   identifying the selected second group in the stored information.

4. The method of claim 2, wherein selecting a third group comprises:
   randomly selecting the third group from the subset of groups.

5. The method of claim 2, wherein shuffling the subset of groups comprises shuffling the subset of groups to determine a random order for the groups in the subset of groups, wherein selecting the first group comprises selecting the first group in the random order, wherein selecting the second group comprises selecting the second group in the random order, and wherein selecting the third group comprises selecting the third group in the random order.

6. The method of claim 1, further comprising:
   receiving a second request to perform the first test on a computing resource;
   obtaining information identifying the subset of groups of computing resources;
   randomly selecting a second group from the subset of groups;
   selecting an available computing resource from the second group; and
   causing the first test to be performed on the selected computing resource.

7. The method of claim 1, wherein the required characteristics identify one or more of one or more hardware characteristics or one or more software characteristics.

8. A system comprising:
   at least one computing device and one or more storage devices storing instructions that are operable, when executed by the at least one computing device, to cause the at least one computing device to perform operations comprising:

maintaining a plurality of computing resources comprising instantiated virtual machines, wherein the plurality of computing resources are organized into a plurality of groups of computing resources, wherein each group of the plurality of groups includes computing resources that share a respective combination of resource characteristics, wherein the resource characteristics are allocated to each virtual machine from a pool of resources;

receiving a first request to perform a first test on a computing resource, wherein the first request comprises a non-concrete requirement among a plurality of required characteristics for the computing resource selected to perform the first test, the non-concrete requirement representing a range of computing resource characteristics or a set of approved computing resources that can satisfy the first request;

determining, from the plurality of groups of computing resources, a subset of groups of computing resources, the subset of groups comprising a plurality of groups that include a respective combination of resource characteristics that satisfy the required characteristics of the first test;

shuffling the subset of groups and selecting a first group from the shuffled subset of groups;

selecting an available computing resource from the first group; and causing the first test to be performed on the selected available computing resource from the first group, wherein causing the first test to be performed comprises transmitting test data associated with the first test to the selected available computing resource, the test data being used by the selected available computing resource to execute the first test.

9. The system of claim 8, the operations further comprising:

receiving a second request to perform a second test on a computing resource;

selecting a second group from the subset of groups;

determining that there are no available computing resources in the selected second group; and selecting a third group from the subset of groups.

10. The system of claim 9, wherein determining that there are no available computing resources in the selected second group comprises:

identifying stored information that identifies groups of computing resources that include no available computing resources; and identifying the selected second group in the stored information.

11. The system of claim 9, wherein selecting a third group comprises:

randomly selecting the third group from the subset of groups.

12. The system of claim 9, wherein shuffling the subset of groups comprises shuffling the subset of groups to determine a random order for the groups in the subset of groups, wherein selecting the first group comprises selecting the first group in the random order, wherein selecting the second group comprises selecting the second group in the random order, and wherein selecting the third group comprises selecting the third group in the random order.

13. The system of claim 8, the operations further comprising:

receiving a second request to perform the first test on a computing resource;

obtaining information identifying the subset of groups of computing resources;

randomly selecting a second group from the subset of groups;

selecting an available computing resource from the second group; and causing the first test to be performed on the selected computing resource.

14. The system of claim 8, wherein the required characteristics identify one or more of one or more hardware characteristics or one or more software characteristics.

15. The system of claim 8, wherein the computing resources are instantiated virtual machines and the resource characteristics are allocated to each virtual machine from a pool of resources.

16. A computer program, encoded on one or more non-transitory computer storage media, comprising instructions that when executed by at least one computing device cause the one or more computers to perform operations comprising:

maintaining a plurality of computing resources comprising instantiated virtual machines, wherein the plurality of computing resources are organized into a plurality of groups of computing resources, wherein each group of the plurality of groups includes computing resources that share a respective combination of resource characteristics, wherein the resource characteristics are allocated to each virtual machine from a pool of resources;

receiving a first request to perform a first test on a computing resource, wherein the first request comprises a non-concrete requirement among a plurality of required characteristics for the computing resource selected to perform the first test, the non-concrete requirement representing a range of computing resource characteristics or a set of approved computing resources that can satisfy the first request;

determining, from the plurality of groups of computing resources, a subset of groups of computing resources, the subset of groups comprising a plurality of groups that include a respective combination of resource characteristics that satisfy the required characteristics of the first test;

shuffling the subset of groups and selecting a first group from the shuffled subset of groups;

selecting an available computing resource from the first group; and causing the first test to be performed on the selected available computing resource from the first group, wherein causing the first test to be performed comprises transmitting test data associated with the first test to the selected available computing resource, the test data being used by the selected available computing resource to execute the first test.

17. The computer program product of claim 16, the operations further comprising:

receiving a second request to perform a second test on a computing resource;

selecting a second group from the subset of groups;

determining that there are no available computing resources in the selected second group; and selecting a third group from the subset of groups.

18. The computer program product of claim 16, the operations further comprising:

receiving a second request to perform the first test on a computing resource;

obtaining information identifying the subset of groups of computing resources;

randomly selecting a second group from the subset of groups;

selecting an available computing resource from the second group; and causing the first test to be performed on the selected computing resource.

19. The computer program product of claim 16, wherein the computing resources are instantiated virtual machines and the resource characteristics are allocated to each virtual machine from a pool of resources.

* * * * *